United States Patent [19]
Noble et al.

[11] Patent Number: 5,944,782
[45] Date of Patent: Aug. 31, 1999

[54] EVENT MANAGEMENT SYSTEM FOR DISTRIBUTED COMPUTING ENVIRONMENT

[75] Inventors: Ken Noble, Livermore, Calif.; Scott Foote; Steve Foote, both of North Easton, Mass.

[73] Assignee: Veritas Software Corporation, Mountain View, Calif.

[21] Appl. No.: 08/732,019

[22] Filed: Oct. 16, 1996

[51] Int. Cl.⁶ .................................................. G06F 17/00
[52] U.S. Cl. ........................................ 709/202; 709/224
[58] Field of Search ..................... 395/200.32, 200.53, 395/200.54, 200.56; 370/401

[56] References Cited

U.S. PATENT DOCUMENTS

| | | | |
|---|---|---|---|
| 5,204,955 | 4/1993 | Kagei et al. | 395/575 |
| 5,621,663 | 4/1997 | Skagerling | 364/550 |
| 5,621,892 | 4/1997 | Cook | 395/200.1 |
| 5,655,081 | 8/1997 | Bonnell et al. | 395/200.32 |
| 5,666,481 | 9/1997 | Lewis | 395/182.02 |
| 5,696,486 | 12/1997 | Poliquin et al. | 340/506 |
| 5,729,472 | 3/1998 | Seiffert et al. | 364/550 |
| 5,758,071 | 5/1998 | Burgess et al. | 395/200.5 |
| 5,758,083 | 5/1998 | Singh et al. | 395/200.32 |
| 5,761,428 | 6/1998 | Sidey | 395/200.32 |
| 5,768,506 | 6/1998 | Randell | 395/200.56 |
| 5,768,508 | 6/1998 | Eikeland | 395/200.32 |
| 5,774,660 | 6/1998 | Brendel et al. | 395/200.32 |
| 5,778,183 | 7/1998 | Filion et al. | 395/200.32 |

OTHER PUBLICATIONS

OpenVision; "OpenV*Event Manager"; OpenVision Technologies, 1995.
Sun Microsytems Computer Company; "Soltice SyMON System Monitor Executive Overview", 1996.

*Primary Examiner*—Ellis B. Ramirez
*Attorney, Agent, or Firm*—Carr & Ferrell LLP; Gregory J. Koerner

[57] ABSTRACT

A management system for event management in a computer network includes management interfaces residing on an administrative computers, management engines residing on server computers, and management agents residing on managed computers within the network. The management agent uses alarms corresponding to predefined events to notify the management interface via the management engine if the predefined events occur, thereby allowing the system administrator to administer the managed computer network. The management agents may also include corrective scripts which are automatically executed in response to the predefined events and a threshold adjustment module which adjusts threshold values which are used to trigger the alarms.

24 Claims, 8 Drawing Sheets

5,944,782

EVENT MANAGEMENT SYSTEM FOR DISTRIBUTED COMPUTING ENVIRONMENT

BACKGROUND OF THE INVENTION

1. Field of the Invention

This invention relates generally to administering computer networks and relates more particularly to a system for managing selected events which occur in a plurality of computers within a computer network.

2. Description of the Background Art

The management of computer networks presents an increasing challenge as the size of these networks grows larger. Computer networks may have a variety of different computers, databases and applications dispersed over a large geographical area and each network component may have different ways of handling information. Ideally these computers are controlled through a relatively small number of "administrative computers" which are dedicated to management and administrative functions, each managing and administrating a large number of the heterogeneous "managed computers."

Management functions include setting and monitoring of various alarms that indicate conditions or "events" requiring management action, the definition and implementation of these actions when the specified events occur, and the monitoring of statistics concerning the operation of the various network computers. This management process can become very complex and time-consuming in large computer networks. Furthermore, the corrective actions for different types of managed computers may vary widely in a highly diverse distributed computing environment. Any given management or administration system used in conjunction with large computer networks is limited by the above factors.

Thus it is desirable to provide a management system that is sufficiently flexible to handle the administration of a wide variety and a large number of managed computers in an efficient manner. Such a management system preferably achieves two distinct objectives. First, as the number of managed computers increases, it becomes essential to prevent the systems administrator from becoming overwhelmed with the increasing amount of management information and action required, and to automate these operations as much as possible. Thus it is desirable to include facilities within a management system to avoid presenting the system administrator with excessive amounts of information and to minimize the number of decisions and actions that are required by the system administrator. Secondly, it is desirable to provide a management system that is optionally self-configuring. Therefore, an improved event management system is needed for administering a distributed computing environment according to the present invention.

SUMMARY OF THE INVENTION

The present invention provides a hierarchically structured management system that monitors defined events and administers prescribed actions in a large number of managed computers. The distributed computing environment may be quite large and the management activity may be monitored at the uppermost tier of the hierarchy from a plurality of management interfaces. A management interface is a program executing on a computer (referred to as an "administrative" computer) with which a system administrator interacts to monitor and direct management operations across managed computers. The management interface administers a plurality of managed computers by interacting with the middle tier of the hierarchy which consists of one or more centrally-located management engines. A management engine is another program executing on a computer (typically a server-class computer) which redirects management requests and operations across many managed computers. The management engine directly communicates with a set of management agents. The management agent is a program running on the managed computer and actually executes the management requests and operations on behalf of the systems administrator. Each management agent includes alarms and information that defines alarm criteria and enables corrective action to be taken. Examples of such alarms include log file error alarms, process alarms indicating the occurrence of defined processes, disk alarms that relate to the amount of available space on a disk, hardware failure alarms, performance alarms relating to statistics of computer operating systems and user-defined alarms. Certain of these alarms generally request or provide an opportunity for corrective action.

In the present management system, the corrective action required by a given alarm can be carried out in many cases locally by the management agent, in contrast to previous management systems. That is, the present management system provides "intelligent" management agents that can be configured to automatically carry out certain actions in response to given alarms, without the necessity of notifying any management interface or system administrator. This "lights out" mode of operation is implemented by a specified set of routines, configured in the management agent, that are invoked by alarm conditions. These routines can be scripts prescribed by the system administrator. The administrator's attention is thus not required by each and every alarm condition and these corrective procedures can be carried out even when a management interface or management engine is inoperable or inaccessible.

The corrective script routines normally are programs that run on the local managed computer (e.g., "local shell execution"). Alternatively, the corrective scripts can be run by management agents as remote shell execution on a management engine or management interface itself. In addition, the management system provides for filtering of alarm messages from various managed computers to avoid redundancy and false alarms. When the management agent on a given computer generates an alarm, previous alarms are compared to the generated alarm and messages are sent to the management engine or interface only at prescribed intervals. That is, if the management agent continuously detects an alarm condition on a managed computer, the messages are filtered so that the alarm messages sent to the administrator are spaced out over a prescribed period. In other words, the administrator is not flooded with a long sequence of identical alarm messages.

Finally, the present invention includes a threshold adjustment module which includes a data gatherer, a threshold calculator and a threshold adjuster. Alarms corresponding to specific events may be generated whenever a current threshold value is exceeded by an existing event value. The manual definition of hundreds to thousands of events, many including thresholds, is very time consuming. The threshold adjustment module can be utilized to automatically configure the threshold values, thereby freeing the system administrator from this time-consuming task.

In practice, the data gather component monitors information needed to calculate the new adjusted threshold value. The threshold calculator selectively then uses one of various methods to calculate a new threshold value. The threshold adjuster then sets the event's threshold in the managed agent to a new value, via a command line interface. The adjustment process may therefore be utilized for a plurality of defined events to effectively implement an auto-configuration methodology according to the present invention.

DETAILED DESCRIPTION OF THE PREFERRED EMBODIMENTS

The present invention comprises a event management system for a distributed computing environment which includes management interfaces residing on an administrative computers, management engines residing on server computers and management agents residing on managed computers within the network. The management agent uses alarms corresponding to predefined events to notify the management interface via the management engine if the predefined events occur, thereby allowing the system administrator to administer the managed computers. The management agents may also include corrective scripts which are automatically executed in response to the predefined events, as well as a threshold adjustment module which adjusts particular threshold levels according to the present invention.

Figure 1:
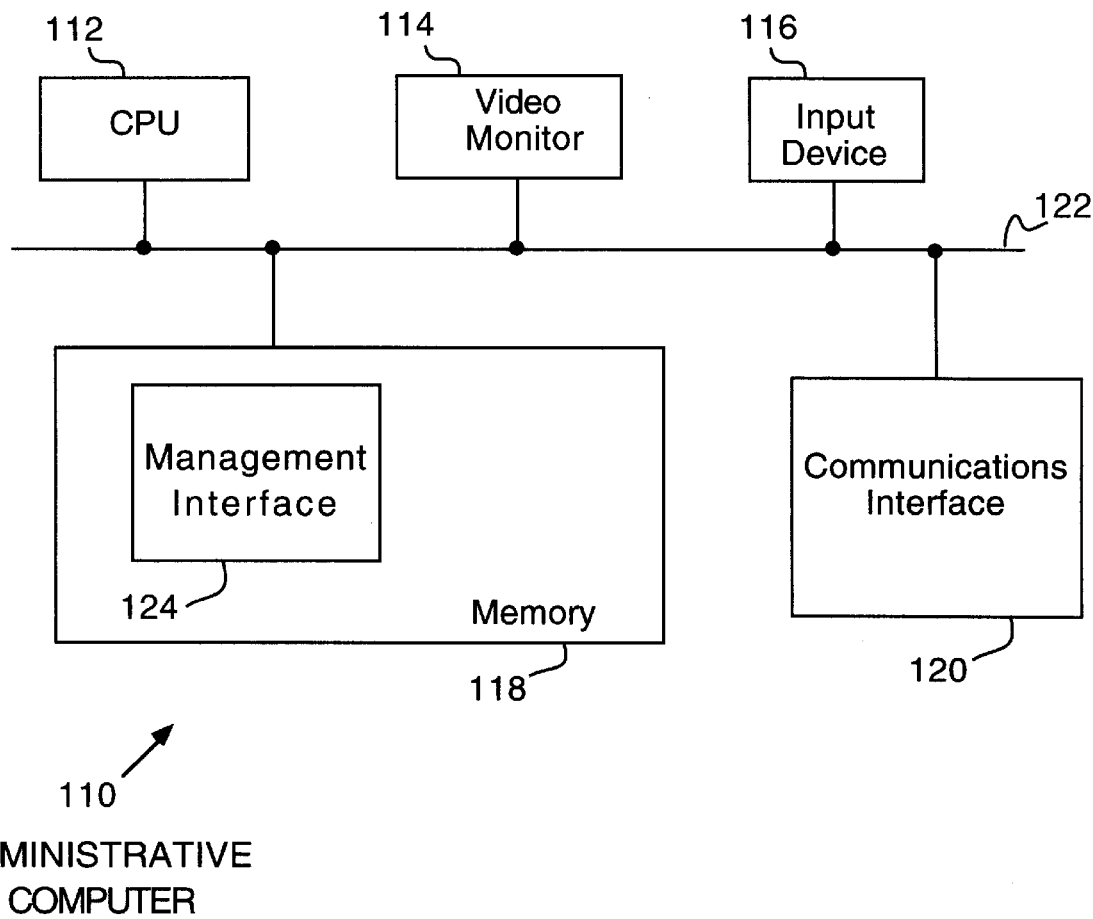
FIG. 1 is a block diagram of an administrative computer including a management interface according to the present invention.

Referring now to FIG. 1, a block diagram of an administrative computer 110 is shown. Administrative computer 110 preferably comprises a central processing unit (CPU) 112, a video monitor 114, an input device 116, a memory 118 and a communications interface 120. In the preferred embodiment, memory 118 contains a management interface 124 which is a program that a systems administrator may use to administer and manage a distributed computing environment. The management interface 124 is further discussed below in conjunction with FIGS. 4, 6 and 7.

Each element of administrative computer 110 preferably has an input and an output coupled to a common system bus 122. Memory 118 may alternatively comprise various storage-device configurations, including Random-Access-Memory (RAM), Read-Only-Memory (ROM), and non-volatile storage devices such as floppy-disks and hard disk-drives. Communication interface 120 is a conventional device which enables administrative computer 110 to communicate with a selected computer network.

Figure 2:
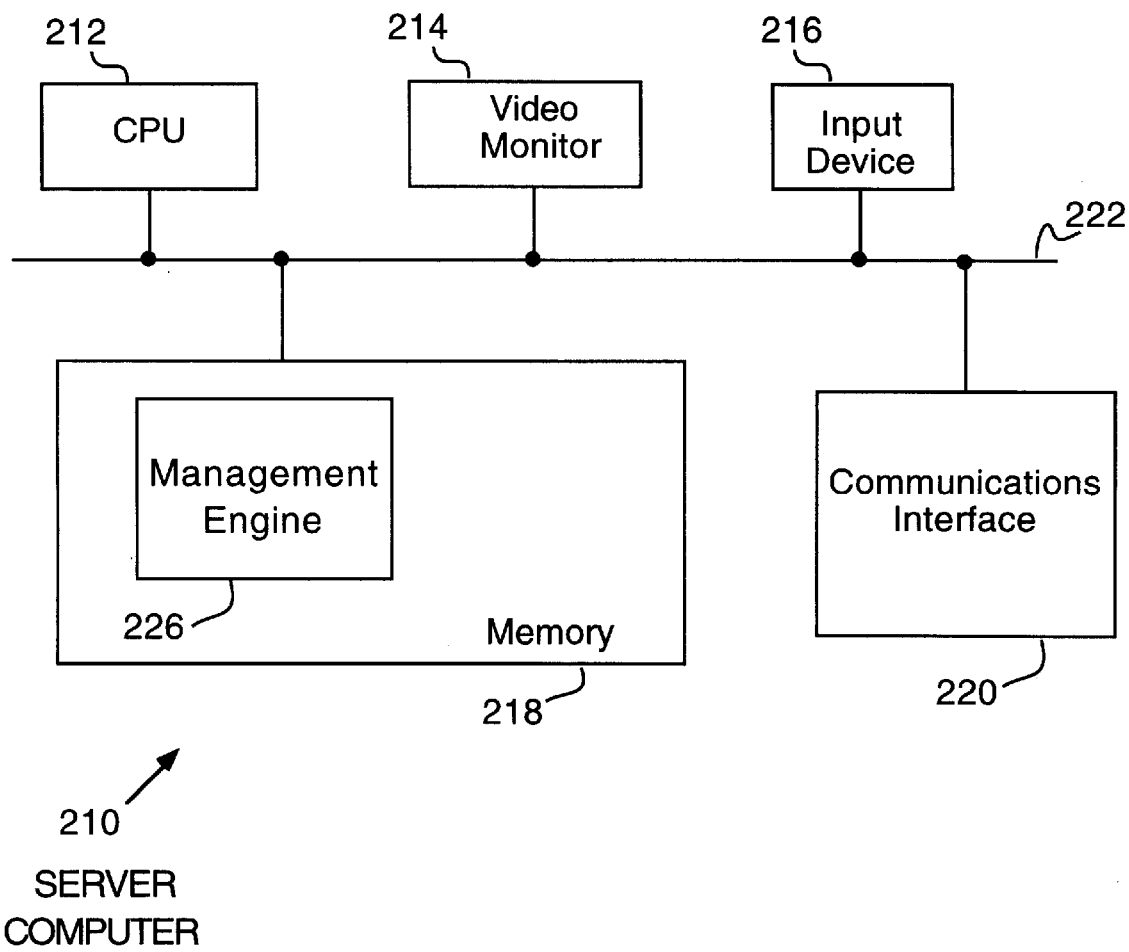
FIG. 2 is a block diagram of a server computer including a management engine according to the present invention.

Referring now to FIG. 2, a block diagram of an server computer 210 is shown. Server computer 210 preferably comprises a central processing unit (CPU) 212, a video monitor 214, an input device 216, a memory 218 and a communications interface 220. In the preferred embodiment, memory 218 contains a management engine 226 which is a program that typically runs on a server-class computer and handles communications between selected components within the distributed computing environment. In other embodiments, management engine 226 may alternately reside within memory 118 of administrative computer 110 (FIG. 1). Management engine 226 is further discussed below in conjunction with FIGS. 4, 6 and 7.

Each element of server computer 210 preferably has an input and an output coupled to a common system bus 222. Memory 218 may alternatively comprise various storage-device configurations, including Random-Access-Memory (RAM), Read-Only-Memory (ROM), and non-volatile storage devices such as floppy-disks and hard disk-drives. Communication interface 220 is a conventional device which enables administrative computer 210 to communicate with a selected computer network.

Figure 3:
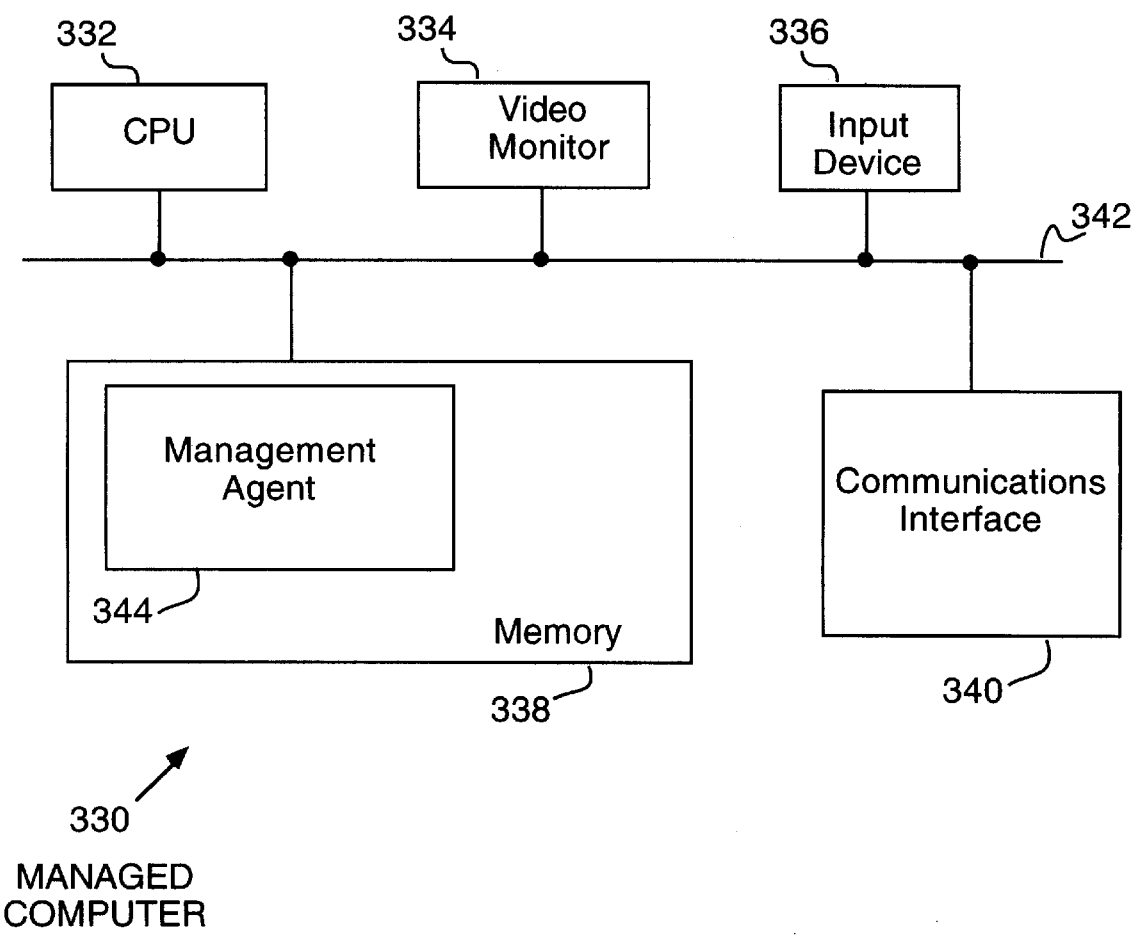
FIG. 3 is a block diagram of a managed computer including a management agent according to the present invention.

Referring now to FIG. 3, a block diagram of a managed computer 330 is shown. Managed computer 330 preferably comprises a central processing unit (CPU) 332, a video monitor 334, an input device 336, a memory 338 and a communications interface 342. In the preferred embodiment, memory 338 contains a management agent 344 which is a program that communicates with management engine 226 and thus indirectly interacts with a management interface 124 within the distributed computing environment. The management agent 344 is further discussed below in conjunction with FIGS. 4–7.

Each element of managed computer 330 preferably has an input and an output coupled to a common system bus 342. Memory 338 may alternatively comprise various storage-device configurations, including Random-Access-Memory (RAM), Read-Only-Memory (ROM), and non-volatile storage devices such as floppy-disks and hard disk-drives. Communication interface 340 is a conventional device which enables managed computer 330 to communicate with a selected computer network.

Figure 4:
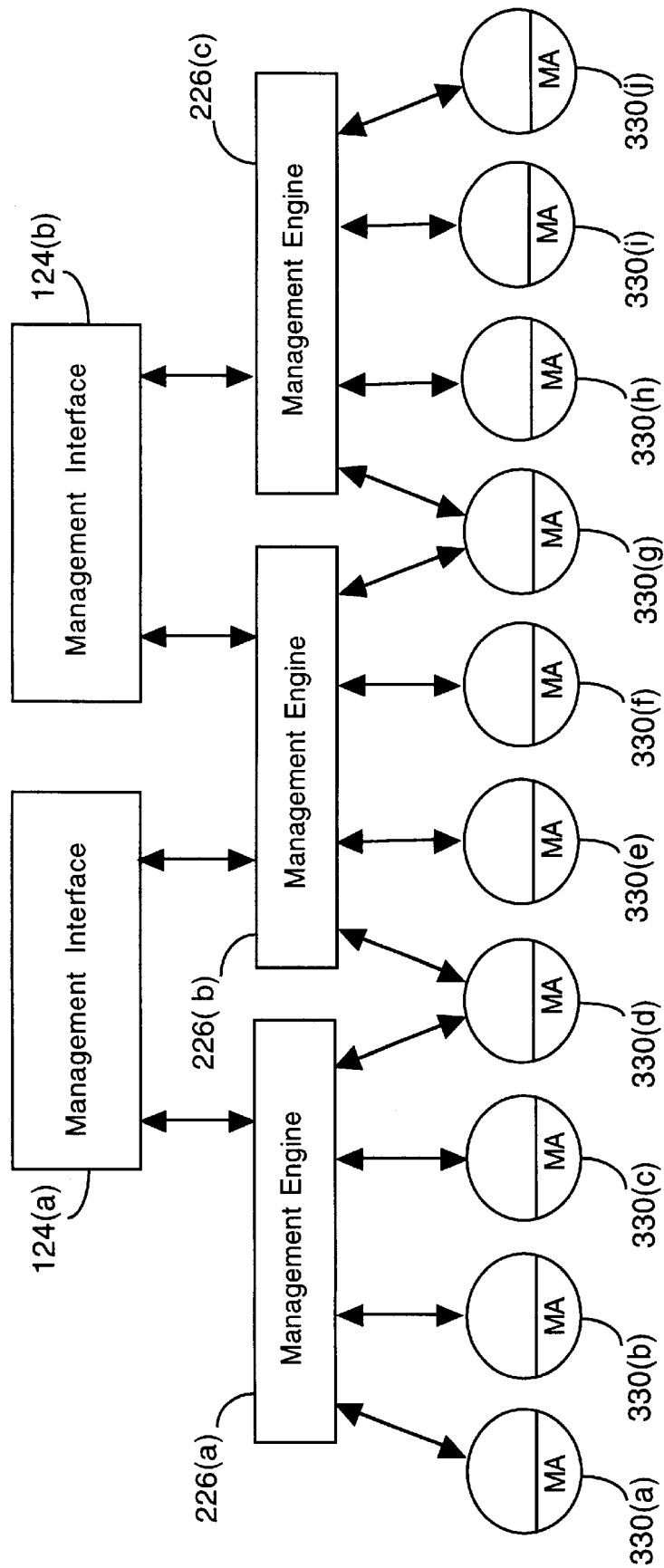
FIG. 4 is a block diagram showing the architecture of an exemplary event management system according to the present invention.

Referring now to FIG. 4, a block diagram of an exemplary event management system is shown. FIG. 4 depicts a small computer network 480 having ten managed computers 330(a through j) each executing a respective management agent 344. Network 480 also includes three management engines 226(a, b and c) which potentially, though not necessarily, execute on their own dedicated server computers 210. Finally, network 480 includes two management interfaces 124(a and b) which potentially, though not necessarily, execute on the systems administrators' dedicated administrative computers 110. In alternate embodiments of the present invention, computer network 480 may readily comprise various configurations other than that shown in FIG. 4. The FIG. 4 configuration of computer network 480 is thus presented for purposes of illustration.

In this simplified example, two management interfaces 124(a) and 124(b) thus administer ten managed computers 330(a through j). Management interface 124(a) communicates with two management engines 226(a) and 226(b). Management engine 226(a) communicates directly with individual management agents 344 on managed computers 330(a through d), while management engine 226(b) communicates with respective management agents 344 on managed computers 330(d through g). Management interface 124(*b*) communicates with the management engine 226(*c*) and this management engine 226(*c*) in turn handles communications with the management agents 344 on managed computers 330(*g* through *j*). As shown in the drawing, management interface 124(*b*) also interacts with the management engine 226(*b*). In other words, each managed computer 330 may be supervised by a plurality of management engines 226 and subsequently by a plurality of management interfaces 124. For example, managed computers 330(*d*) and 330(*g*) are each supervised by two different management engines 226 as illustrated in FIG. 4.

Figure 5:
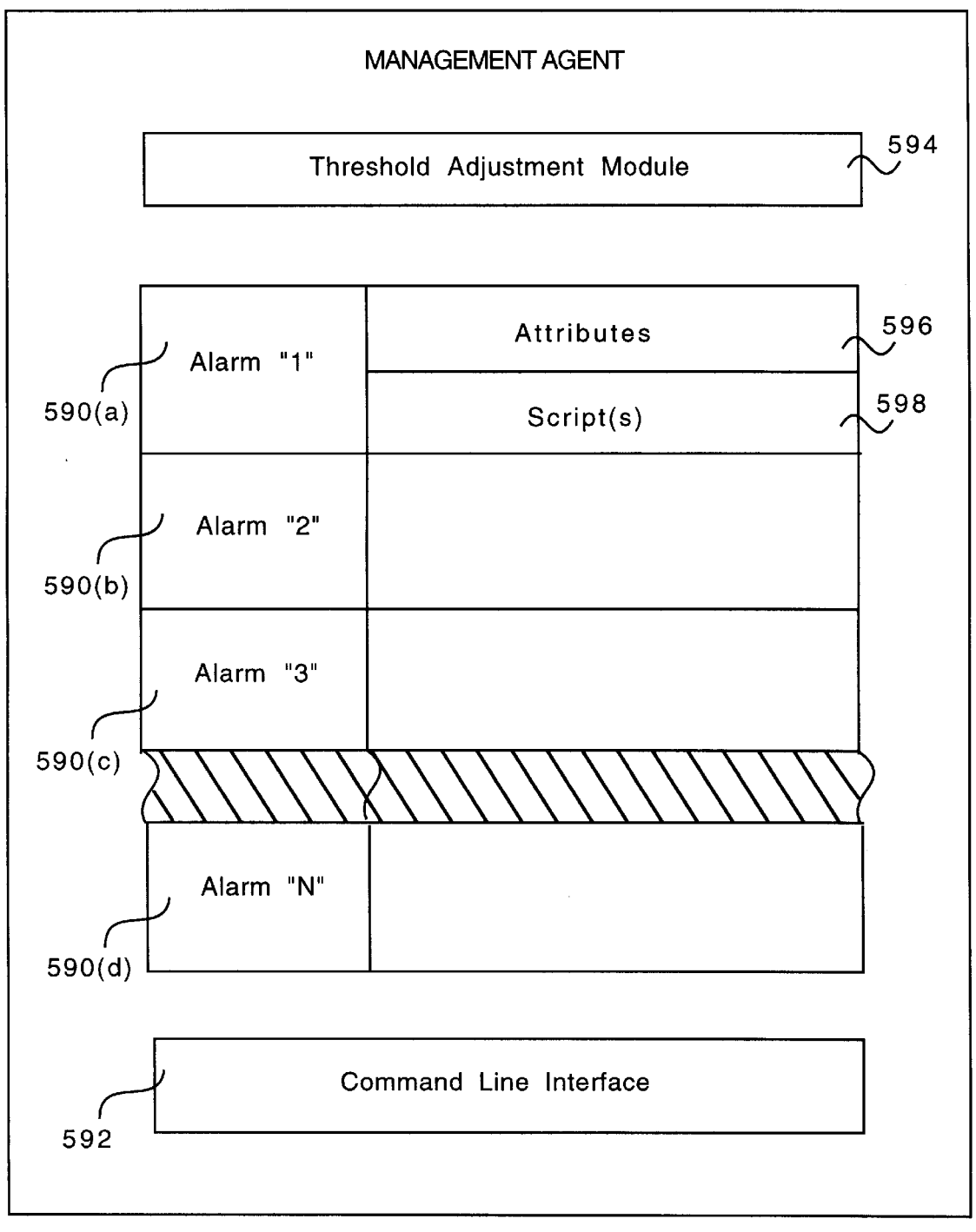
FIG. 5 is a block diagram showing the preferred embodiment of the management agent of FIG. 3.

Referring now to FIG. 5, a block diagram of the preferred embodiment for management agent 344 is shown. In the preferred embodiment, management agent 344 includes data describing a series of events and also incorporates a command line interface (CLI) 592 and a threshold adjustment module (TAM) 594 which are further described below in conjunction with FIGS. 6 through 8.

The number of possible alarms 590 is variable depending upon the number of defined events in managed computer 330. FIG. 5 includes alarm 1 (590(*a*)) through alarm "N" (590(*d*)) for purposes of illustration. Individual alarms 590 are selectively triggered whenever management agent 344 detects the occurrence of a corresponding predefined event within managed computer 330. Each of these alarms 590 is a persistent object with defined attributes 596, which may include the threshold (defining when the alarm is triggered), severity (importance or urgency), collector (instructions for testing for the alarm), and notification (entities notified of the alarm). The threshold attribute is further discussed below in conjunction with FIGS. 6–8.

Each alarm 590 may also include one or more corresponding scripts 598 which are responsive or corrective processes initiated by the alarm 590 in response to the occurrence of a predefined event. Each event definition may be applied to multiple managed computers 330. Once an alarm 590 is triggered it persists until it is reset. Each set of attributes 596 and each script 598 may be specified by the system administrator.

The management system of the present invention includes a variety of alarms 590. Examples include text string or message log alarms, which are triggered by detection of designated text strings such as error messages or date/time messages. Process alarms are set off by the occurrence or absence of designated processes. Query alarms run at time intervals set by the system administrator and interrogate the system to return Boolean values (i.e. "yes/no" or "true/false"). Disk space alarms check for available space on a disk and are triggered when this space is less than a threshold value. Hardware alarms detect hardware faults. Performance alarms can be defined to monitor certain statistics of the operating system, such as the number of system calls of a certain type, and may be triggered by current values or by running averages. Finally, the present invention also encompasses user-defined alarms.

In addition, the management agent 330 may include a set of default corrective scripts 596, which may be defined by the user, that are automatically carried out in response to certain defined alarms 590 without first notifying the system administrator. This mode of operation (termed "lights out") enables the management agent 344 on a given managed computer 330 to take corrective action automatically for those type of alarms 590 which do not require intervention by the system administrator. For example, in the case of a hardware failure alarm for a peripheral device, the management agent 344 may disable the device immediately without prior notification to the system administrator. Alternatively, an alarm 590 may be defined to require user-authorization before running a corrective shell script 596. Thus, in comparison with previous systems, the present management system has the advantage that the administrator's attention and response are not necessarily required for the appropriate corrective action. The present invention has the further advantage that alarms 590 and corrective scripts 596 may continue to function when management interface 124 or management engine 226 becomes inoperable or inaccessible.

Finally, the alarms 590 are preferably filtered to avoid redundancy and false alarms. This "intelligent" alarm filtering reduces the number of instances in which an alarm 590 is triggered in an environment that has not changed from the previous instance in which the same alarm 590 was triggered. The manner in which this intelligent filtering is carried out depends on the type of alarm 590. Intelligent filtering does not apply to user defined alarms 590, which are triggered according to the conditions defined by the user.

In the case of performance alarms, triggering occurs when the current value or the running average value of some quantity crosses a defined threshold. For example, if the alarm is intended to be triggered when the quantity exceeds a threshold value, then an intelligent filter alarm definition will ensure that when the alarm is triggered once and it will not go off again until the alarm quantity falls below the threshold and then exceeds the threshold again. This technique for intelligent filtering is also implemented for process alarms and space alarms.

For message log alarms, a sampling frequency is defined, and within each sampling interval the alarm is triggered by the first occurrence of the alarm message, and is retriggered by no succeeding occurrences of that message within the same interval. Query alarms are triggered by Boolean values of some variable, namely "true-false" or "yes-no". If an intelligently filtered query alarm is triggered by the value "true" of a variable, then it will not be triggered again until this variable takes the value "false" and then returns to the value "true". Intelligent filtering of printer alarms are similar in concept. If a printer alarm is triggered by a spool queue job, then it will not be triggered again until a different spool queue job commences and the alarm condition is again satisfied.

To summarize, when the management agent 344 on a given managed computer 330 generates an intelligently filtered alarm 590, an action script 596 may be specified to provide comparison of previous alarms with the generated alarm. This comparison allows the user to prescribe intervals between transmission of alarm messages to the management engine 226 and on to the management interface 124. Thus, if the management agent 344 continuously detects an alarm 590 on a managed computer 330, the alarms 590 are filtered so that the notifications sent to the administrator are spaced out over a prescribed period. The system administrator is thereby notified of an alarm condition, and periodically receives reminders that the condition continues to exist, until corrective action takes place and the alarm 590 is reset. The parameters of this entire process are defined by the user.

Figure 6:
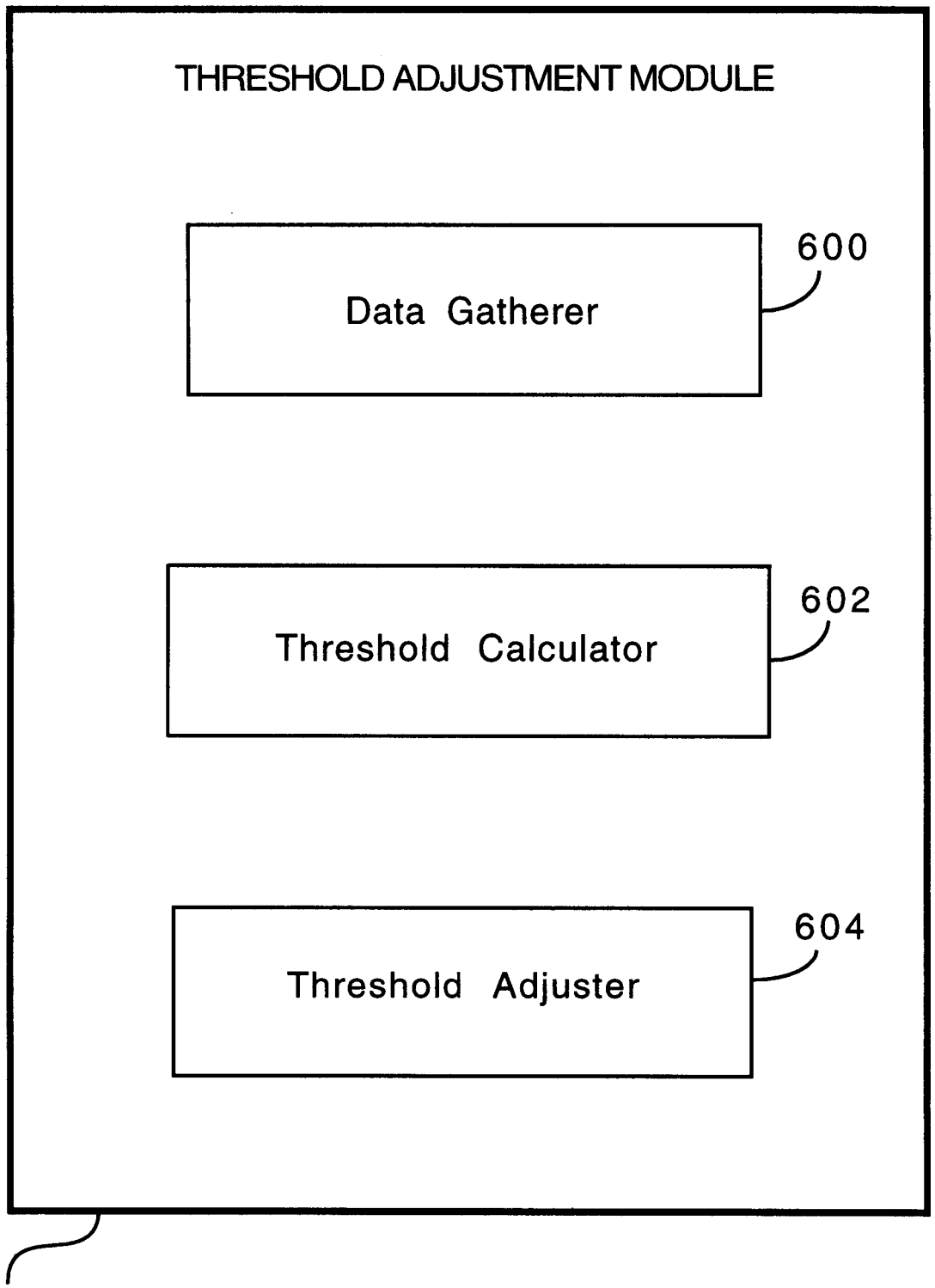
FIG. 6 is a block diagram showing the preferred embodiment of the threshold adjustment module of FIG. 5.

Referring now to FIG. 6, a block diagram of the preferred embodiment for the threshold adjustment module (TAM) 594 is shown. TAM 594 is a special software routine which includes data gatherer 600, threshold calculator 602 and threshold adjuster 604. The event management system may effectively use TAM 594 to automatically adjust selected event definitions within management agents 344.

Each defined event within a given management agent 344 typically comprises a variety of attributes 596 which may include a specified threshold value that corresponds to the defined event. A threshold value is the specified value that triggers a corresponding alarm 590 for a particular event within management agent 344. For example, an alarm 590 may be triggered as soon as the current event value becomes greater than the corresponding defined threshold value. Alternately, a different alarm 590 may be triggered as soon as the current event value becomes lower than the corresponding defined threshold value.

In the preferred embodiment, threshold values for triggering alarms 590 may be set automatically by activating TAM 594, or may be set by the system administrator when TAM 594 is deactivated. A distributed computing environment may contain many management agents 344 each containing numerous defined events having separate thresholds. The event management system may thus use TAM 594 for automatically adjusting thresholds to efficiently configure the management agents 344. Furthermore, the automatic threshold configuration may also be used to generate a typical threshold profile for the entire distributed computing environment.

In the preferred embodiment, data gatherer 600 collects data that is needed to recalculate threshold values after alarms 590 have been activated. Typically, the collected data includes the current defined threshold value which existed when alarm 590 was triggered. The collected data also preferably includes the particular event value which triggered alarm 590. In practice, the event value that triggered alarm 590 may be provided along with notification of the alarm 590. Data gatherer 600 may also obtain any other data needed to calculate the new threshold value, depending upon the calculation method that is employed.

Threshold calculator 602 accesses the data compiled by data gatherer 600 and then uses the accessed data to calculate a new adjusted threshold value to replace the threshold value that existed when alarm 590 was triggered. In one embodiment, threshold calculator 602 generates a "delta value" by calculating the difference between the current threshold value (when alarm 590 was triggered) and the event value which triggered alarm 590. Threshold calculator 602 then modifies the current threshold value by a configurable percentage of the delta value to obtain the new adjusted threshold value.

The present invention comprises events with thresholds which trigger alarms 590 when the event value becomes greater than the threshold value (positive-going thresholds). The present invention also comprises events with thresholds which trigger alarms 590 when the event value becomes less than the threshold value (negative-going thresholds). In practice, threshold calculator 602 typically lowers the current threshold value to adjust negative-going thresholds and raises the current threshold value to adjust positive-going thresholds.

In an alternate embodiment, threshold calculator 602 may generate a new adjusted threshold value by multiplying the current threshold value (when alarm 590 is triggered) by a configurable percentage value. In yet another embodiment, threshold calculator may simply copy the event value that triggered alarm 590 to obtain the new adjusted threshold value. Furthermore, threshold calculator 602 may also analyze the historical threshold averages for a particular event to calculate a new adjusted threshold value that is subject to a dampening process to thereby prevent excessive fluctuation during threshold adjustment.

Threshold adjuster 604 accesses the new adjusted threshold value to perform the actual adjustment procedure in conjunction with management agent 344. In the preferred embodiment, management agent 344 contains a command line interface (CLI) 592 which allows threshold adjustment module 594 to directly communicate a program command line to management agent 344 to effectively adjust the current threshold value. Threshold adjuster 604 thus calls CLI 592 and transmits a "threshold adjust" command which identifies the particular event threshold that is being adjusted and which also specifies the new adjusted threshold value.

Management agent 344 receives the threshold adjust command line via CLI 592 and responsively redefines the attributes 596 of the identified event by replacing the current threshold value with the new adjusted threshold value. The present invention thus has the ability to recursively reset the threshold value that initially triggered alarm 590.

Figure 7:
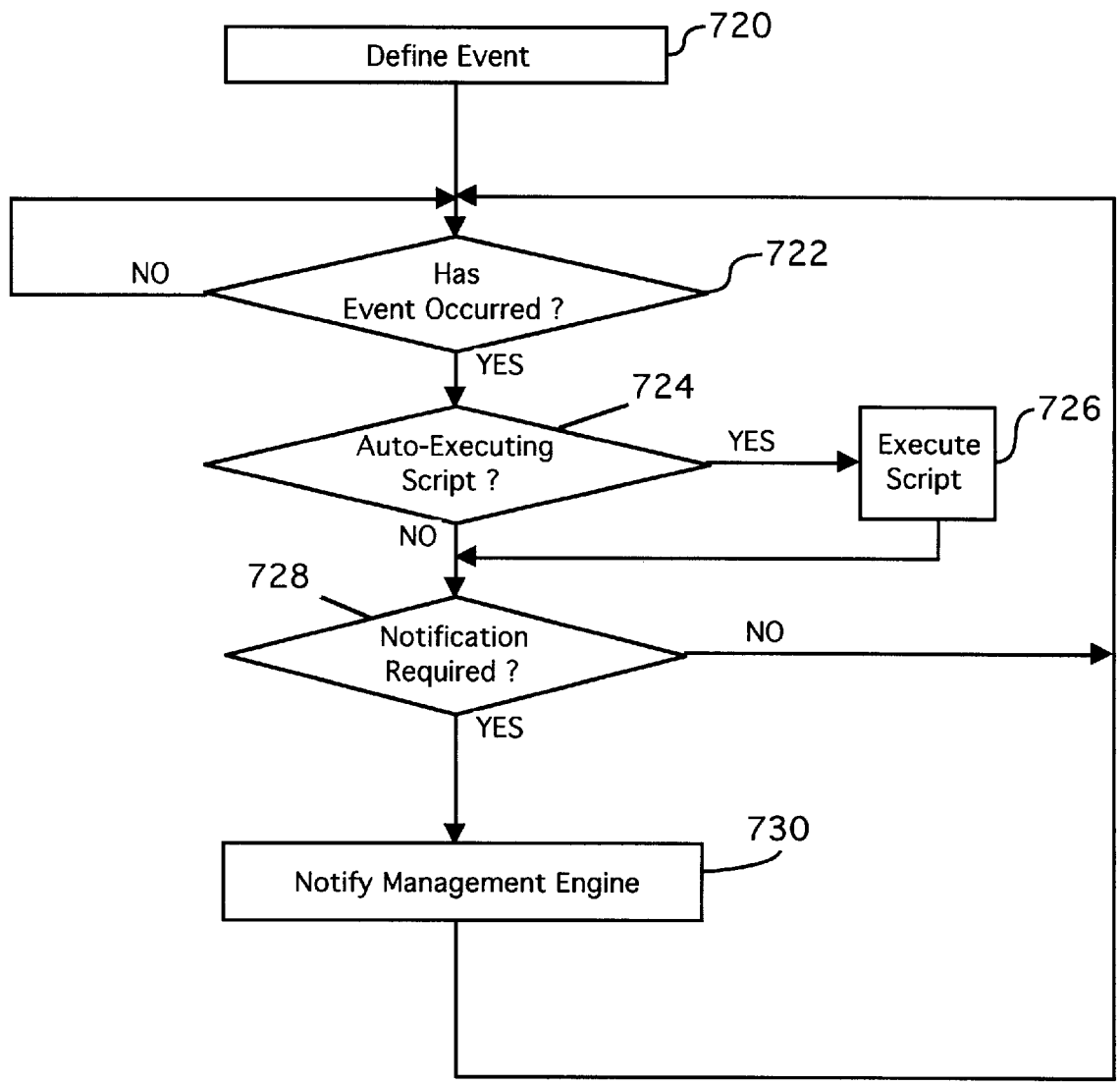
FIG. 7 is a flowchart of preferred basic method steps for managing an event according to the present invention.

Referring now to FIG. 7, a flowchart of preferred method steps for managing an event is shown, according to the present invention. Initially, a system administrator defines 720 one or more events, including setting initial threshold levels in management agent 344. Management agent 344 then checks 722 to determine if any of the defined events have occurred.

If an event has not occurred, then management agent 344 continues to watch for the occurrence of an event. If, however, a defined event has occurred, then management agent 344 determines 724 whether there is a corresponding auto-executing script 598. This auto-executing script preferably may also include the threshold adjustment module 594, if module 594 is currently activated. If an auto-executing script 598 or the threshold adjustment module 594 is available, then management engine 344 executes 726 the script 598 or the threshold adjustment module 594 (if a current threshold has been exceeded) and the FIG. 7 process advances to step 728. If threshold adjustment module 594 is executed, then step 726 results in a new event definition (step 720) as discussed above in conjunction with FIG. 6 and as further discussed below in conjunction with FIG. 8.

If no auto-executing script 596 exists and if threshold adjustment module 594 is not executed, then management agent 344 determines 728 whether notification of the occurrence of the event is required. If notification is not required, the FIG. 7 process returns to step 722. However, if notification is required, then management agent 344 sends notice 730 of the event occurrence to management interface 124 via management engine 226, and the FIG. 7 process returns to step 722 to watch for the occurrence of another defined event.

Figure 8:
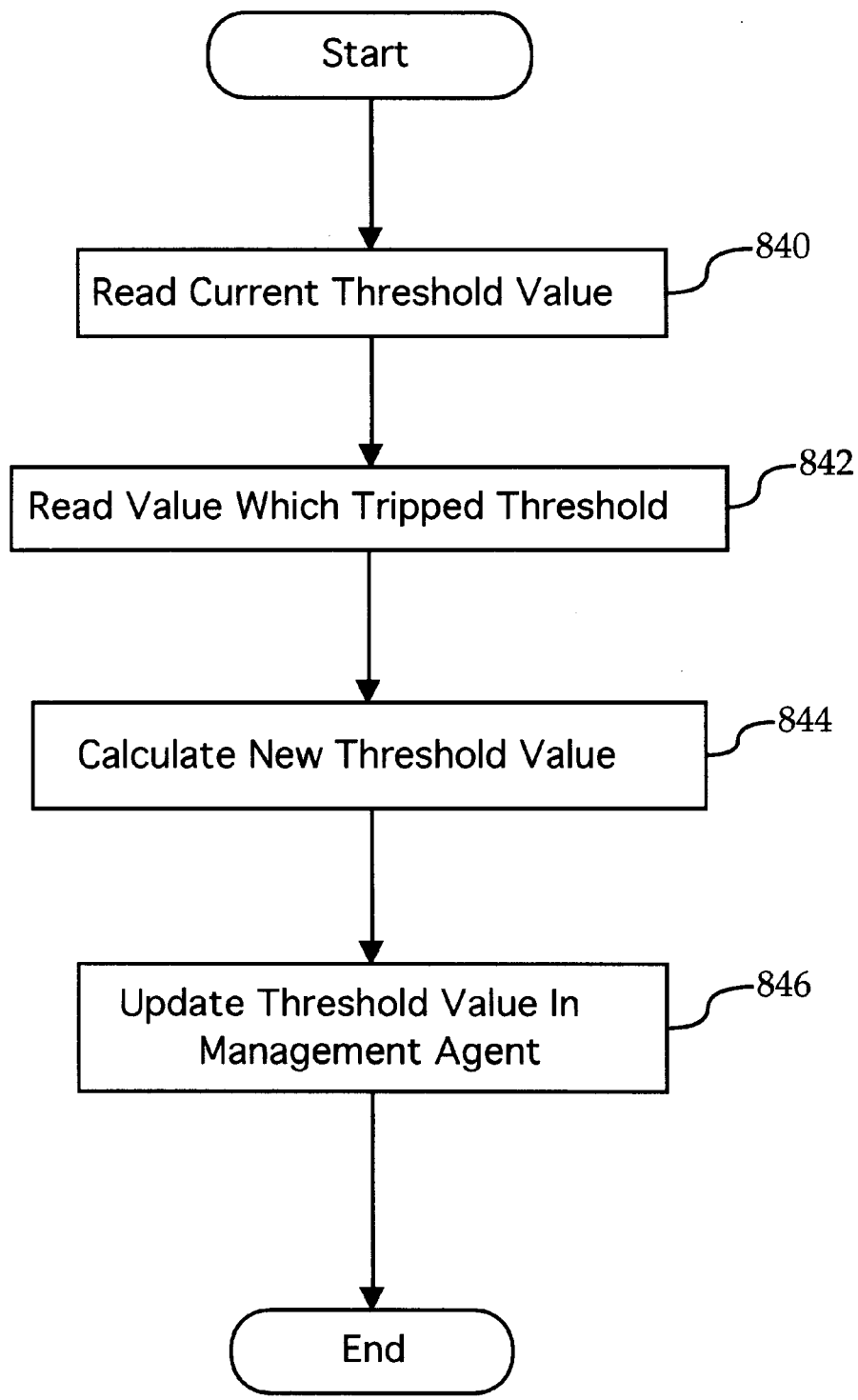
FIG. 8 is a flowchart of preferred method steps for adjusting a threshold according to the present invention.

Referring now to FIG. 8, a flowchart of preferred method steps for adjusting a threshold within managed computer 330 is shown. The flowchart of FIG. 8 provides further detail for step 726 of FIG. 7, but is typically invoked only when threshold adjustment module 594 is active, and when a particular current threshold value is exceeded.

In the preferred embodiment, data gatherer 600 (within threshold adjustment module 594) initially reads 840 the current threshold value that is stored in attributes 596 at the time that alarm 590 is triggered. Next, data gatherer 600 reads 842 and stores the event value which tripped (exceeded) the current threshold value. Then, threshold calculator 602 (within threshold adjustment module 594) accesses the data compiled by data gatherer 600 to responsively calculate a new adjusted threshold value to replace the current threshold value in existence when alarm 590 was triggered. As discussed above in conjunction with FIG. 6, threshold calculator 602 may alternately use a number of different selectable techniques to advantageously calculate the new adjusted threshold value.

Threshold adjuster 604 then accesses the new adjusted threshold value to update 846 the current threshold value in management agent 344. Threshold adjuster 604 preferably calls a command line interface 592 in management agent 344 and transmits a "threshold adjust" command which identifies the particular event threshold that is being adjusted and which also specifies the new adjusted threshold value. Therefore, management agent 344 receives the threshold adjust command line via command line interface 592 and responsively redefines the attributes 596 of the identified event by replacing the current threshold value with the new adjusted threshold value. FIG. 8 describes an adjustment technique for modifying a single event threshold, however the FIG. 8 process may also advantageously be used to manage a plurality of event thresholds within a distributed computing environment.

It will be appreciated that the above-described management system overcomes major drawbacks associated with prior management systems by relieving the system administrator of a great deal of administrative effort in diverse computing environments. Such environments can give rise to large numbers of alarms 590 during a given time period. Management interface 124 and the system administrator are not required to address and respond to all of the alarms 590 that are generated by the managed computers 330. Responses are required only for alarms 590 that are specifically defined to call for a response. Also, alarms 590 that require a response are fed to the management interface 124 in an orderly and regular fashion, and only those alarms 590 are received that actually required by the systems administrator.

The foregoing description of the preferred embodiment for the present invention has been presented for purposes of illustration and description and is not intended to be exhaustive or to limit the invention to the precise forms disclosed. Modifications and variations of the invention are possible in light of the above teaching. It is intended that the spirit and scope of the invention are to be defined by reference to the following claims, along with the full scope of their equivalents.

What is claimed is:

1. A system for managing a computer network, comprising:
    an administrative computer containing an interface for managing said computer network;
    a server computer containing an engine for communicating with said interface;
    a managed computer containing an agent for accessing a standard connection to communicate with said engine, said agent incorporating definitions of specified events and, when a selected one of said specified events occur, being capable of automatically taking corrective actions and notifying said interface via said engine; and
    an alarm activated when an automatically adjustable threshold value is exceeded by an operating value of said specified events.

2. The system of claim 1 further comprising
    an adjustment module which responsively adjusts said threshold value.

3. The system of claim 2 wherein said adjustment module comprises a data gatherer for collecting information needed to adjust said threshold value.

4. The system of claim 3 wherein said adjustment module further comprises a threshold calculator for accessing said information and responsively calculating a new adjusted threshold value.

5. The system of claim 4 wherein said adjustment module further comprises a threshold adjuster for replacing said threshold value with said new adjusted threshold value via a command line interface.

6. The system of claim 5, wherein said agent can take corrective actions even when said interface or said engine is inoperable or inaccessible.

7. A method for managing a computer network, comprising the steps of:
    defining specified events within a managed computer;
    detecting said specified events using an agent within said managed computer; and
    establishing a standard connection between said agent and an engine within a server computer; wherein said agent is capable of
    sending a notification of said specified events from said agent to an interface within an administrative computer via said standard connection;
    automatically taking corrective actions; and
    activating an alarm when an automatically adjustable threshold value is exceeded by an operating value of said specified events.

8. The method of claim 7 further comprising the step of adjusting said threshold value using an adjustment module in response to said alarm.

9. The method of claim 8 wherein said adjustment module comprises a data gatherer for collecting information needed to adjust said threshold value.

10. The method of claim 9 wherein said adjustment module further comprises a threshold calculator for accessing said information and responsively calculating a new adjusted threshold value.

11. The method of claim 10 wherein said adjustment module further comprises a threshold adjuster for replacing said threshold value with said new adjusted threshold value via a command line interface.

12. The method of claim 11 wherein said agent can take corrective actions even when said interface or said engine is inoperable or inaccessible.

13. A computer-readable medium comprising program instructions for managing a computer network by performing the steps of:
    defining specified events within a managed computer;
    detecting said specified events using an agent within said managed computer; and
    establishing a standard connection between said agent and an engine within a server computer; wherein said agent is capable of
    sending a notification of said specified events from said agent to an interface within an administrative computer via said standard connection;
    automatically taking corrective actions; and
    activating an alarm when an automatically adjustable threshold value is exceeded by an operating value of said specified events.

14. The computer-readable medium of claim 13 further comprising the step of
    adjusting said threshold value using an adjustment module in response to said alarm.

15. The computer-readable medium of claim 14 wherein said adjustment module comprises a data gatherer for collecting information needed to adjust said threshold value.

16. The computer-readable medium of claim 15 wherein said adjustment module further comprises a threshold calculator for accessing said information and responsively calculating a new adjusted threshold value.

17. The computer-readable medium of claim 16 wherein said adjustment module further comprises a threshold adjuster for replacing said threshold value with said new adjusted threshold value via a command line interface.

18. The computer-readable medium of claim 17 wherein said agent can take corrective actions even when said interface or said engine is inoperable or inaccessible.

19. A system for managing a computer network, comprising:

means for defining specified events within an agent in a managed computer;

means for detecting said specified events in said managed computer;

means for establishing a standard connection between said agent and an engine within a server computer;

means for sending a notification of said specified events from said agent to an interface within an administrative computer via said standard connection;

means for said agent to automatically take corrective actions; and means for activating an alarm when an automatically adjustable threshold value is exceeded by an operating value of said specified events.

20. The system of claim 19 further comprising means for responsively adjusting said threshold value.

21. The system of claim 20 wherein said means for adjusting comprises means for collecting information needed to adjust said threshold value.

22. The system of claim 21 wherein said means for adjusting further comprises means for accessing said information and responsively calculating a new adjusted threshold value.

23. The system of claim 22 wherein said means for adjusting further comprises means for replacing said threshold value with said new adjusted threshold value via a command line interface.

24. The system of claim 23 wherein said agent can take corrective action even when said interface of said engine is inoperable or inaccessible.

* * * * *